United States Patent [19]

Watkins, Sr.

[11] Patent Number: 4,503,809
[45] Date of Patent: Mar. 12, 1985

[54] SOW-OPERATED FEED STALL

[76] Inventor: Nathan L. Watkins, Sr., Rte. 3, Box 24A, Linden, Tenn. 37096

[21] Appl. No.: 522,515

[22] Filed: Aug. 12, 1983

[51] Int. Cl.³ .............................................. A01K 29/00
[52] U.S. Cl. ........................................................ 119/27
[58] Field of Search ....................... 119/27, 20, 50, 54

[56] References Cited

U.S. PATENT DOCUMENTS

| | | | |
|---|---|---|---|
| 579,484 | 3/1897 | Jarrett | 119/27 |
| 1,443,203 | 1/1923 | Bell | 119/27 |
| 3,033,164 | 5/1962 | Evers | 119/54 |
| 3,415,227 | 12/1968 | Welsh | 119/27 |
| 3,473,515 | 10/1969 | Atchinson, Sr. | 119/27 |
| 3,543,723 | 12/1970 | Gilst | 119/27 |
| 3,785,346 | 1/1974 | Dower | 119/27 |
| 4,129,096 | 12/1978 | Nickel | 119/27 |
| 4,198,927 | 4/1980 | Guiavarc'h | 119/27 |

FOREIGN PATENT DOCUMENTS

| | | | |
|---|---|---|---|
| 1060652 | 7/1959 | Fed. Rep. of Germany | 119/27 |
| 2057461 | 12/1971 | Fed. Rep. of Germany | 119/27 |
| 2701119 | 7/1978 | Fed. Rep. of Germany | 119/27 |
| 2818686 | 11/1979 | Fed. Rep. of Germany | 119/27 |

Primary Examiner—Robert Peshock
Assistant Examiner—Kris R. Schulze
Attorney, Agent, or Firm—Harrington A. Lackey

[57] ABSTRACT

An animal feed stall having a rear opening adapted to be opened and closed by a pair of pivotal gates, a feed trough in the front of the enclosure having a pivotally mounted lid operatively connected through pivotal linkage mechanism to the pivotal gates, whereby an animal, such as a sow, upon entry into the feed stall, can elevate the lid with her nose to open the feed trough, and the operative linkage between the lid and the gates causes the gates to close while the animal is feeding within the stall.

7 Claims, 2 Drawing Figures

SOW-OPERATED FEED STALL

BACKGROUND OF THE INVENTION

This invention relates to animal feed stalls, and more particularly to a sow-operated feed stall.

Feed stalls for animals are well-known in the art. Moreover, feed stalls having gate mechanisms for controlling entry and egress of the animals to and from the stall, and for limiting the number of animals in a stall to a single feeding animal, are also known. Typical prior feeding stalls are shown in the following U.S. Pat. Nos.:

| | | |
|---|---|---|
| 579,484 | Jarrett | Mar. 23, 1897 |
| 1,443,203 | Bell | Jan. 23, 1923 |
| 3,415,227 | Welsh | Dec. 10, 1968 |
| 3,473,515 | Atchinson, Sr. | Oct. 21, 1969 |
| 3,543,723 | VanGilst | Dec. 1, 1970 |
| 3,785,346 | Dower | Jan. 15, 1974 |
| 4,129,096 | Nickel | Dec. 12, 1978 |
| 4,198,927 | Guiavarc'h | Apr. 22, 1980 |

The above patents to Jarrett, Bell, Atchinson, Sr., VanGilst, and Guiavarc'h, disclose feed stalls having access doors which are automatically closed by a trigger mechanism actuated by the animal after the animal has entered the stall enclosure.

The patents to Jarrett, Atchinson, Sr., and VanGilst, disclose stalls having rear gates hinged about vertical axes and connected through linkage bars to one or more levers or actuating bars in front of the feed trough.

However, none of the above patents disclose an animal feed stall having pivotal access doors which are controlled by the movement of the lid on the feed trough, the lid being actuated by the animal.

SUMMARY OF THE INVENTION

It is therefore an object of this invention to provide an animal feed trough, and particularly a feed trough designed for feeding sows, in which the rear doors to the stall are linked to a movable lid normally covering the feed trough, so that elevation of the lid by the nose of the sow automatically closes the access doors to the stall behind the feeding sow.

The feed stall made in accordance with this invention preferably includes side walls and a front wall, or normally stationary removable front gate, and a rear access opening adapted to be opened and closed by a pair of swinging rear gates. Mounted in front of the stall on the lower portion of the front wall is a feed trough having an upper opening normally closed by a pivotal lid. A linkage mechanism is mounted on the feed stall and pivotally connects the lid and the gates, so that when the lid is raised by the nose of the sow to gain access to the feed trough, the rear doors are automatically and simultaneously swung shut behind the sow to prevent the entry of other animals while the sow is feeding.

After the sow completes her feeding, she can back out of the stall, simultaneously forcing the rear gates open to permit her exit. The opening rear gates simultaneously cause the lid to close the feed trough, so that the feed will not only be protected from the elements, but will be inaccessable to any other animals entering the feed stall who do not use their nose to lift the lid.

The feed stall made in accordance with this invention is particularly beneficial for the feeding of gestating sows whose feed intake must be controlled, without interference from other animals.

DESCRIPTION OF THE PREFERRED EMBODIMENT

Figure 1:
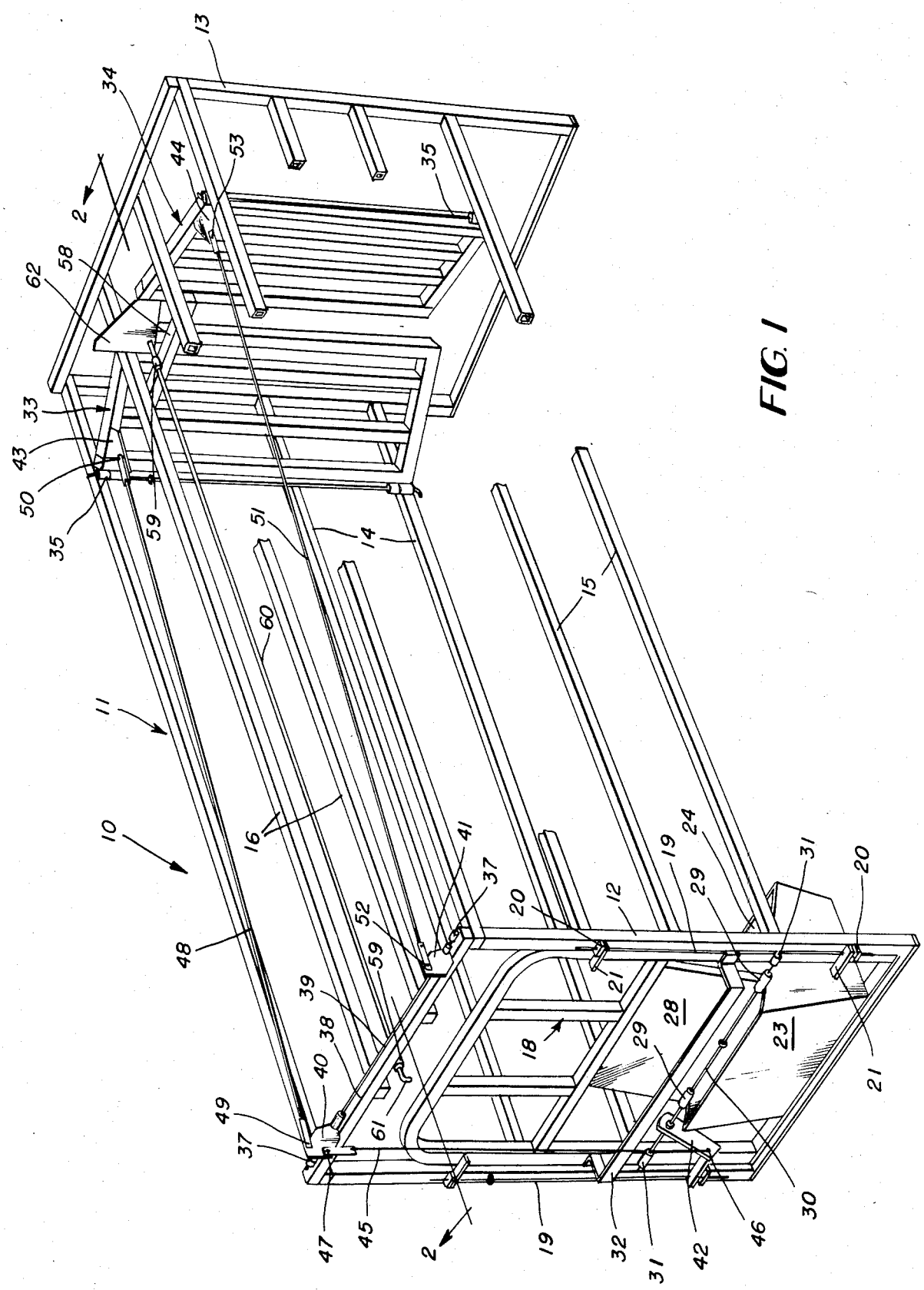
FIG. 1 is a top front perspective view of the feed stall made in accordance with this invention, with portions broken away, and with the feed trough lid shown in an open position and the rear gates partially closed.

Referring now to the drawings in more detail, the feed stall 10 made in accordance with this invention includes an enclosure frame 11 having a front end frame 12, an open rear end frame 13, side frame walls 14 and 15 and a top frame wall 16. The enclosure frame 11 may be made of any desired materials, such as steel or wood.

Figure 2:
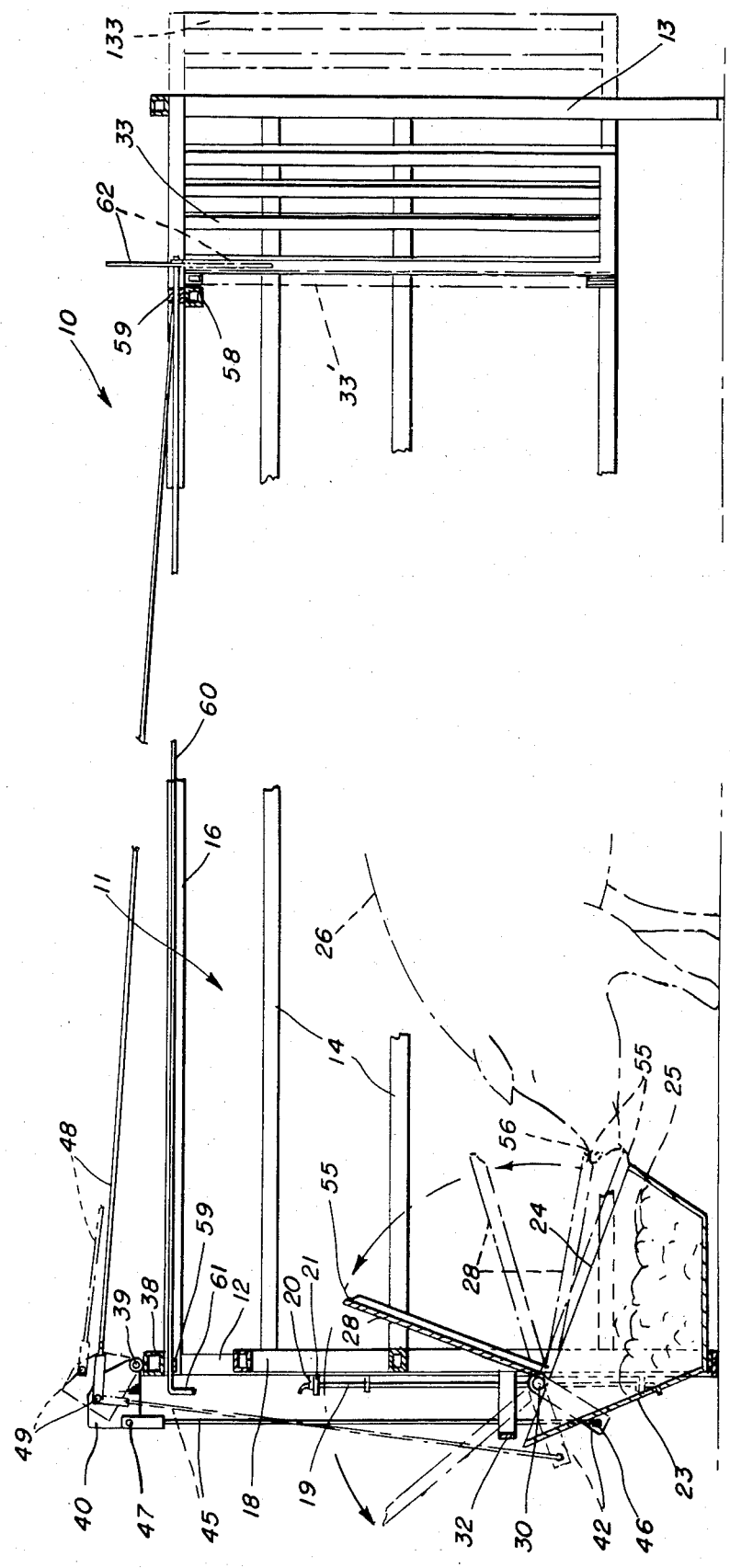
FIG. 2 is a fragmentary section taken along the line 2—2 of FIG. 1, illustrating the operation of the feed trough lid by a sow, partially shown in phantom.

Although the front end frame 12 may be permanently closed, the particular front end frame 12, disclosed in FIGS. 1 and 2, includes a removable front panel 18, which is maintained in a position closing the open front end frame 12 by means of a pair of vertical retaining rods 19 inserted through mating apertures in the overlapping lugs 20 and straps 21.

Fixed within the lower open portion of the front panel 18 is a feed trough 23 having an open upper or top portion 24, and adapted to receive feed 25 (FIG. 2) for an animal, such as the sow 26.

Pivotally mounted upon the feed trough 23 and adapted to normally close the open upper portion 24, is a lid 28. The front edge of the lid 28 is fixed by brackets 29 to a transverse rotary shaft 30 journaled in the opposed bearings 31 attached to the front panel 18, as best disclosed in FIG. 1.

A transverse stop bar 32 is fixed to and spaced in front of the front panel 18 to provide a stop or limit to the forward opening movement of the lid 28.

Spaced slightly forward of the open rear frame 13 are a pair of gates 33 and 34. The outside edge of each gate 33 and 34 is pivotally mounted by hinge members 35 to the side frame walls 14 and 15 to permit vertical swinging movement of the rear gates 33 and 34. The doors 33 and 34 are adapted to swing toward each other to a substantially co-planar closed position 33' (FIG. 2), closing the rear passage through the enclosure frame 11, and to swing rearward to an open position 133(FIG. 2) to permit entry or exit of an animal to be fed, such as the sow 26. FIGS. 1 and 2 disclose the gates 33 and 34 in a partially open position in solid lines.

Rotatably mounted in bearings 37 on top of the transverse frame bar 38 of the front end frame 12 is a rotary transverse shaft 39. Fixed to the rotary shaft 39 are a pair of transversely spaced lever members 40 and 41.

Fixed to and radially extending from the lower rotary lid shaft 30 is a lever arm 42.

Fixed to and projecting forwardly from the top portion of each of the gates 33 and 34 are lever plate members 43 and 44, respectively.

A first or front elongated connecting rod 45 is pivotally connected at its lower end by a pin 46 to the lever arm 42, and at its upper end by a pin 47 to the lever member 40, as disclosed in FIGS. 1 and 2.

A second elongated connecting rod 48 is connected at its front end by pivot pin 49 to the lever member 40, and at its rear end by pivot pin 50 to the lever plate member 43.

A third elongated connecting rod 51 is connected at its front end by pivot pin 52 to the lever member 41 and at its rear end by pivot pin 53 to the lever plate member 44.

Thus, the feed trough lid 28 and both gates 33 and 34 are operatively connected together through an interconnecting pivotal link mechanism, so that the lid 28 and both gates 33 and 34 move simultaneously with each other.

When the lid 28 is in its lower closed position as disclosed in phantom in FIG. 2, the gates 33 and 34 are in their open position such as 133, permitting entry to, and exit from, the enclosed space within the enclosure frame 11.

When the trough lid 28 is raised about the transverse pivotal axis of the rotary shaft 30, the gates 33 and 34 simultaneously, and in corresponding increments, pivot forwardly. When the lid 28 is in its upper extreme open position, the gates 33 and 34 are in their extreme closed position 33'.

To permit the sow 26 to open the lid 28, the free edge 55 of the lid 28 may project rearwardly slightly over the corresponding front edge of the trough 23 to permit the snout or nose 56 of the sow 26 to fit beneath the lip 55 sufficiently that, by raising its head, the sow 26 may lift the lid 28 with sufficient force, not only to lift the weight of the lid 28, but also to actuate the linkages from the lever arm 42 to the lever plate members 43 and to pull the gates 33 and 34 forward.

In the operation of the feed stall 10, the rear gates 33 and 34 are normally swung to their open position, as illustrated by the phantom lines 133 in FIG. 2, and the lid 28 is down in its closed position rendering the feed trough 23 inaccessible for feeding while the lid 28 remains closed.

The sow 26 to be fed enteres the open rear end frame 13, passes between the open rear gates 33 and 34 and enters the enclosure frame 11. After the sow 26 reaches the feed trough 23, she engages her nose or snout 56 beneath the overlapping lip 55, and raises her head, thereby causing the lid 28 to swing upward, as illustrated in FIG. 2. As the lid 28 swings upward, the lever arm 42 swings downward, pulling down the front connecting rod 45, to rotate the lever member 40 in a counter-clockwise direction as viewed in FIGS. 1 and 2. The counter-clockwise rotation of the lever member 40 pulls the connecting rods 48 and 51 forward to draw forward the gates 33 and 34, causing them to swing toward a closed position, as illustrated by the phantom position 33' in FIG. 2. With the lid 28 open, the sow 26 is free to eat the feed 25 through the open upper portion 24, with complete freedom from interference from other animals, since the closed gates 33 and 34 prevent entry of other animals.

After the sow 26 has completed her feeding, she may back out of the stall 16, simultaneously forcing open the rear gates 33 and 34. The rearward swinging doors 33 and 34 simultaneously cause the lid 28 to swing toward its closed position, through the interconnecting linkage. By the time the doors 33 and 34 are open wide enough to permit the sow 26 to withdraw from the enclosure frame 11, the lid 28 will be completely closed to protect the feed 25 within the trough 23 from the elements, as well as from the feeding of any other animal, until such animal lifts the lid 28.

The stall 10 may be provided with a manually operated locking mechanism for locking the gates 33 and 34 in their closed position, when desired. Mounted on the front transverse frame bar 38 and a rear transverse frame bar 58 are a pair of bearings 59 in which is journaled an elongated rotary latch shaft 60 having a handle 61 at its front end. The rear end of the shaft 60 is fixed to a stop member, such as the stop or abutment plate 62, normally in an upper inoperative position disclosed in solid lines in both the drawing figures, clear of the swinging movement of the gates 33 and 34. By rotating the handle 61, the stop plate member 62 may be rotated downward to its dashed-line locking position (FIG. 2) in the rearward swinging path of the gates 33 and 34 to prevent the gates 33 and 34 from swinging open.

What is claimed is:

1. A feed stall for an animal comprising:
   (a) an elongated enclosure frame large enough to receive a single animal therein, said enclosure frame having side walls, a front end and a rear opening to permit entry to and exit from the enclosure frame by the animal,
   (b) a gate pivotally mounted on said enclosure frame for swinging movement to open and close said rear opening,
   (c) a feed trough having an upper opening and mounted within said enclosure frame adjacent said front end,
   (d) a lid mounted on said feed trough for movement between a closed position covering said upper opening, and an open position away from said upper opening to expose the contents of said feed trough for feeding,
   (e) said lid in closed position having a portion adapted to be engaged and raised by the nose of an animal within said enclosure frame to said open position, and
   (f) link means operatively connecting said lid and said gate, whereby movement of said lid from its closed position to its open position actuates said link means to move said gate to close said rear opening, and movement of said gate to open said rear opening actuates said link means to move said lid from its open position to its closed position.

2. The invention according to claim 1 further comprising means for pivotally mounting said lid upon said trough to swing between said open and closed positions, said link means comprising a lever arm connected to said pivotal mounting means and operatively connected to said gate.

3. The invention according to claim 2 in which said link means further comprises lever means pivotally mounted upon said frame enclosure and spaced from said lid and said gate, a first connecting rod pivotally connected to said lever arm and said lever means, and a second connecting rod pivotally connected to said lever means and said gate, to effect simultaneous pivotal movement of said lid and said gate.

4. The invention according to claim 3 in which said lever means is pivotally mounted on the upper portion of said front end of said enclosure frame, and said second connecting rod is pivotally connected to an upper portion of said gate and is located above the space normally occupied by an animal within said enclosure frame.

5. The invention according to claim 4 in which said gate comprises a first gate, and further comprising a second gate, hinge means mounting said first and second gates upon said enclosure frame for swinging movement about vertical axes toward and away from each other to open and close said rear opening, said second connecting rod being pivotally connected to said first gate, a front transverse shaft connected to and defining the pivotal axis of said lever means, a second lever member fixed to said front transverse shaft, a third connecting rod pivotally connected to said second lever means and to said second gate, whereby swinging movement of said lid causes simultaneous pivotal movement of said gates.

6. The invention according to claim 1 further comprising hinge means pivotally mounting said gate for swinging movement about a vertical axis, locking means comprising a stop member, and means mounting said stop member on said enclosure frame above said gate, when said gate is in said closed position, to prevent opening said gate.

7. The invention according to claim 6 in which said mounting means for said stop member comprises an elongated rod rotatably mounted on the upper portion of said enclosure frame, said stop member being fixed to said rotary rod for rotary movement therewith, and manual means for rotating said rod to pivotally move said stop member between an elevated position out of the swinging path of said gate and said lowered position locking said gate.

* * * * *